United States Patent [19]

Booher

[11] Patent Number: 4,534,589

[45] Date of Patent: Aug. 13, 1985

[54] UNITIZED TRAILER ASSEMBLY

[76] Inventor: Howard Booher, P.O. Box 277, Randolph, Ohio 44265

[21] Appl. No.: 592,078

[22] Filed: Mar. 22, 1984

[51] Int. Cl.³ .............................................. B62D 21/02
[52] U.S. Cl. .................................... 296/182; 296/204; 52/630; 52/667; 403/347
[58] Field of Search ............... 296/182, 181, 204, 183, 296/209, 29; 403/346, 347; 52/630, 667, 664, 785, 819, 821, 422

[56] References Cited

U.S. PATENT DOCUMENTS

| | | | |
|---|---|---|---|
| 2,791,439 | 5/1957 | Swanson | 280/106 |
| 2,812,192 | 11/1957 | Cole | 280/106 |
| 3,042,423 | 7/1962 | Bock | 280/106 |
| 3,319,393 | 5/1967 | Tantlinger et al. | 296/182 |
| 3,705,732 | 12/1972 | Marinelli | 296/182 |
| 3,909,059 | 9/1975 | Benninger et al. | 296/182 |
| 4,084,834 | 4/1978 | Becker | 280/106 |
| 4,226,465 | 10/1980 | McCullough | 296/182 |
| 4,232,884 | 11/1980 | DeWitt | 280/785 |

Primary Examiner—Robert R. Song
Attorney, Agent, or Firm—Harpman & Harpman

[57] ABSTRACT

A trailer with a unitized floor construction is formed of a pair of horizontally spaced, longitudinally extending beams and a plurality of longitudinally spaced transversely extending cross frame members positioned in aligned longitudinally spaced openings in the upper portions of said beams. A floor is positioned on the upper surfaces of the beams and cross frame members and welded thereto. The cross frame members are cross sectionally U-shaped and with the floor form closed shapes imparting unusual rigidity to the flat bed trailer.

6 Claims, 5 Drawing Figures

UNITIZED TRAILER ASSEMBLY

BACKGROUND OF THE INVENTION

1. Technical Field

This invention relates to over-the-road trailers of the type used to transport various articles of commerce over the highways.

2. Description of the Prior Art

Prior art trailers of this type normally utilize longitudinally extending horizontally spaced main frame members and a plurality of subframe members transversely positioned with respect thereto and secured to the main frame members so as to support a deck. Reinforcing members are frequently positioned between the longitudinally extending main frame members and some trailer constructions utilize diagonal bracing along the outer sides of the main frame to support the lontitudinal edges of the deck.

See for example U.S. Pat. Nos. 2,791,439, 2,812,192, 3,042,423, 4,084,834 and 4,232,884.

Applicant's invention as disclosed herein incorporates novel cross frame members welded in openings or notches in longitudinally extending beams with the upper surfaces of the cross frame members and the longitudinally extending beams on a common plane and the deck or floor welded thereto in a unitized structure.

SUMMARY OF THE INVENTION

A unitized trailer is formed of longitudinally extending horizontally spaced beams and a plurality of transversely positioned cross frame members welded in spaced aligned openings in the beams. A floor is welded to the upper surfaces of the frame members and the beams and outside rails are welded to the outer opposite ends of the cross frame members to form a low profile, compact, exceedingly rigid unitized flat bed trailer.

DESCRIPTION OF THE PREFERRED EMBODIMENT

Figure 1:
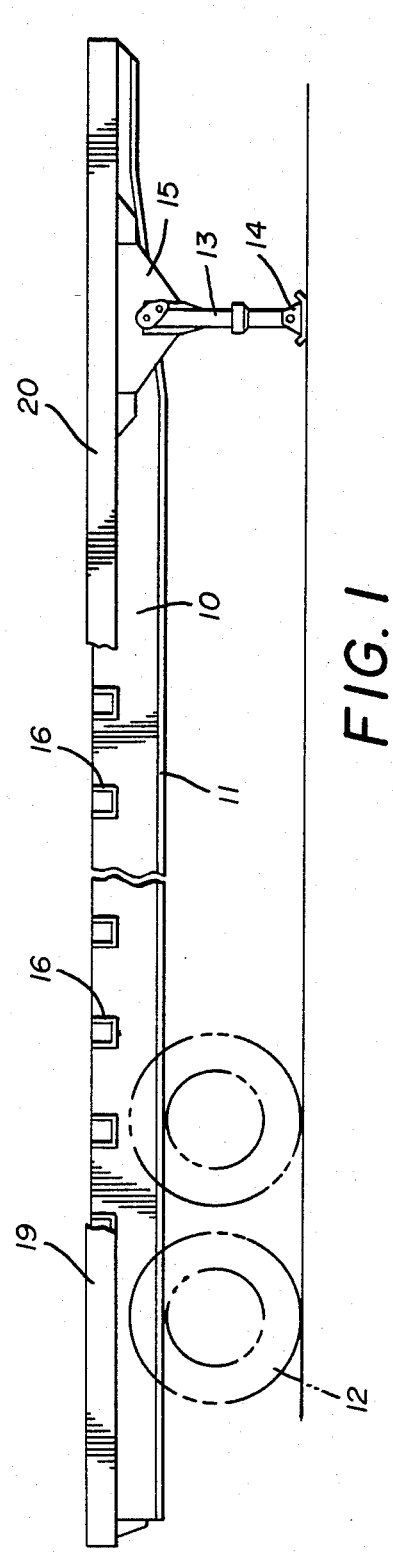
FIG. 1 is a side elevation of a unitized trailer with parts broken away and parts in cross section.
Figure 2:
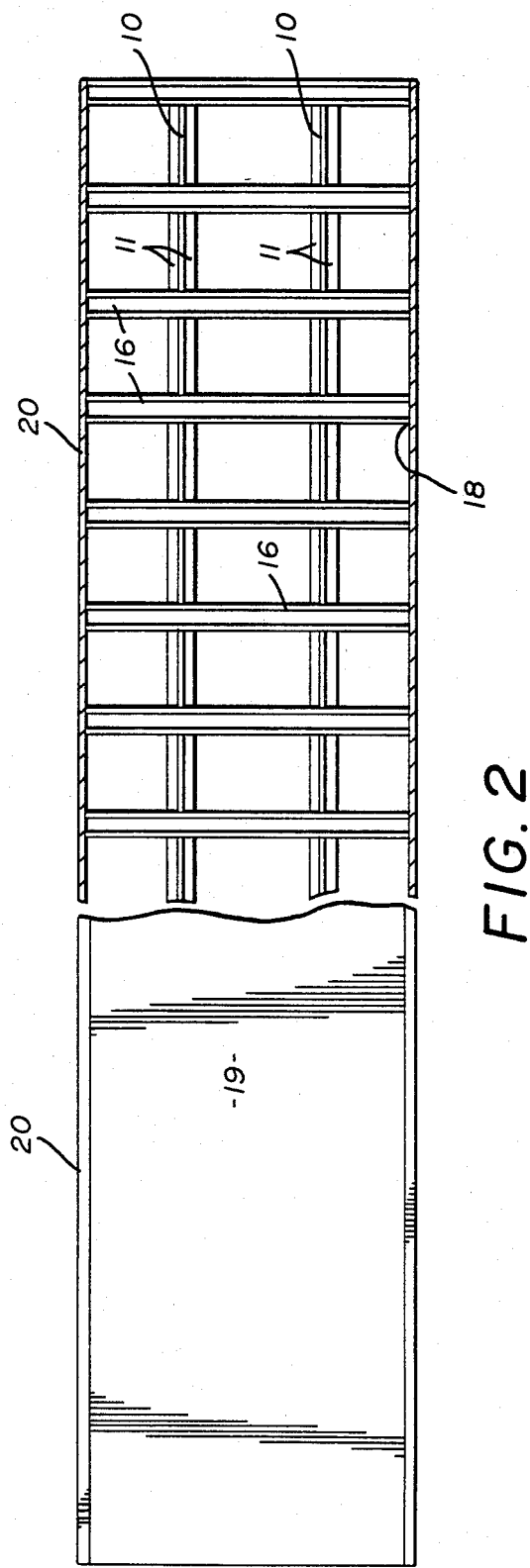
FIG. 2 is a top plan view of the unitized trailer with parts broken away and parts in cross section.
Figure 3:
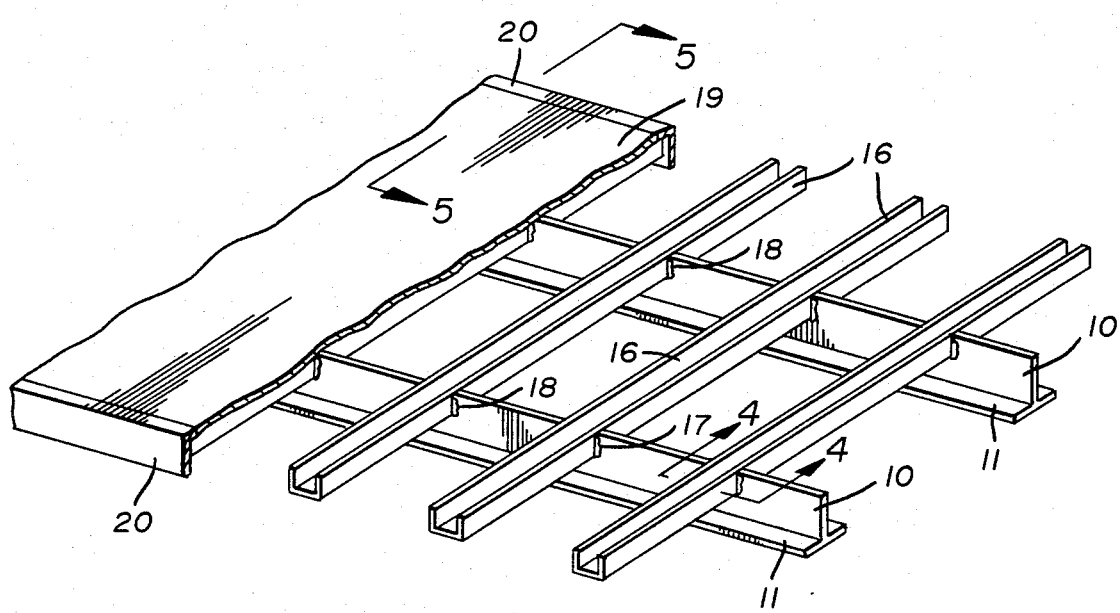
FIG. 3 is a perspective view of a portion of the unitized trailer with parts broken away and parts in cross section.

Referring to FIGS. 1 and 2 of the drawings, a flat bed trailer can be seen which is preferably formed of aluminum extrusions and fabricated aluminum sections having a unique low profile with strength and rigidity and unusual resistance to distortion. The trailer is formed of a pair of horizontally spaced longitudinally extending inverted T-shaped beams 10 having horizontally disposed flanges 11. Wheels 12, shown in broken lines, and a wheel support assembly, not shown, are positioned under the rear portion of the unitized trailer and secured to the longitudinally extending beams 10 as will be understood by those skilled in the art. A retractable dual leg support 13 having pivoted ground engaging shoes 14 is attached to the forward portion of the unitized trailer by brackets 15 secured to several of a plurality of transversely positioned cross frame members 16 having a cross sectionally U-shaped configuration. The cross frame members 16 are located in longitudinally spaced transversely aligned openings or notches 17 in the upper portions of the longitudinal beams 10 as best seen in FIGS. 1 and 3 of the drawings.

Figure 4:
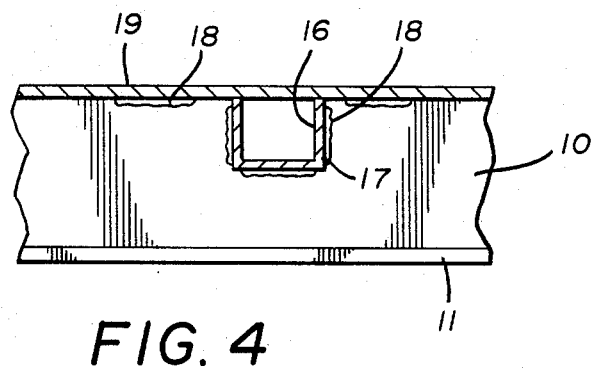
FIG. 4 is an enlarged cross sectional view on lines 4—4 of FIG. 3.
Figure 5:
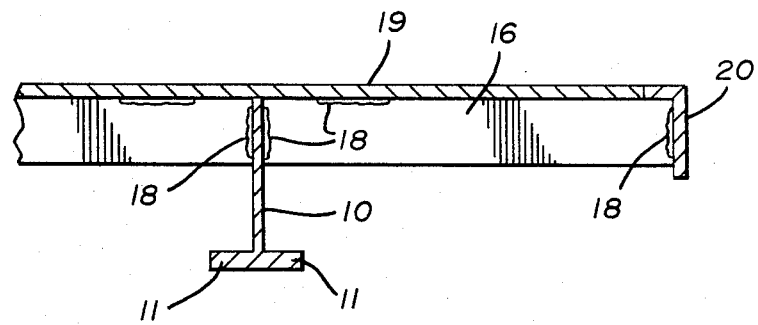
FIG. 5 is an enlarged cross sectional view on lines 5—5 of FIG. 3.

By referring to FIGS. 4 and 5 of the drawings, it will be seen that one of the cross frame members 16 is shown positioned in a notch 17 in a beam 10 and secured by welding the same thereto and to a floor plate 19, the welds being indicated by the numeral 18. By welding the cross frame members 16 in the aligned notches 17 in the spaced longitudinally extending beams 10, the cross sectionally U-shaped frame members 16 are evenly supported and held in place alleviating the possibility of side wall deflection found in the prior art cross frame constructions.

It will be seen that the unitized trailer disclosed herein in its preferred embodiment is formed of aluminum extrusions and plates welded to one another in a unitized rigid structure, the arrangement of the cross sectionally U-shaped cross frame members 17 with their uppermost edges flush with the upper edges of the inverted T-shaped longitudinal beams 10 enables the floor plates 19 to be supported directly thereby and forms strong, rigid, box-like beams of each of the cross frame members 16. The cross sectionally U-shaped cross frame members 16 and the notches 17 in the beams 10 are of controlled sizes to insure the desirable and accurate positioning of the frame members 16 in the beams 10 so as to form continuous side to side supporting structures for the floor 19 and the side rails 20 which are welded to the outer ends of the frame members 16.

While the trailer herein is disclosed in the form of a flat bed trailer, it is also used as the unitized floor of a dump trailer by adding side and end walls and it forms the floor portion of a horizontal unloader trailer where a ram moves the load along the unitized floor to a rear discharge location.

It will thus be seen that a unitized trailer has been disclosed that incorporates novel structural members welded in an assembly that produces an exceedingly strong distortion resistant trailer of relatively light weight capable of handling heavy loads and that various changes and modifications may be made therein without departing from the spirit of the invention and having thus described my invention.

What I claim is:

1. A unitized trailer structure consisting of a pair of horizontally spaced longitudinally extending vertically disposed beams having upper and lower portions, horizontally disposed longitudinally extending flanges on the lower portions of said beams, a plurality of cross sectionally U-shaped cross frame members positioned in longitudinally spaced transversely aligned notches in the upper portions of said longitudinally extending beams and welded thereto, and a floor positioned on the upper portions of said beams and said U-shaped cross frame members and welded thereto so as to form the unitized rigid structure.

2. The unitized trailer structure set forth in claim 1 and wherein each of said cross sectionally U-shaped cross frame members has a horizontal wall and a pair of vertical walls and wherein each of the notches in the upper portions of said beams are of a matching U-shape with respect to the cross sectionally U-shaped cross frame members.

3. The unitized trailer structure set forth in claim 2 and wherein said cross sectionally U-shaped cross frame members are of a known width and are of a height substantially the same as said width so as to form with said floor a closed hollow box-like frame member.

4. The unitized trailer structure set forth in claim 2 and wherein the vertically disposed beams are of a known height and the cross sectionally U-shaped cross frame members are of a height substantially half the height of said beams.

5. The unitized trailer set forth in claim 2 and wherein the vertically disposed beams are of a known height and the cross sectionally U-shaped cross frame members are of a height substantially half the height of said beams and wherein the longitudinal extending flanges on said lower portions of said beams are of a known width and wherein the cross sectionally U-shaped cross frame members are of a width substantially the same as the width of said longitudinally extending flanges.

6. The unitized trailer set forth in claim 1 and wherein side rails are welded to the opposite outer ends of said cross sectionally U-shaped cross frame members and the trailer forms a flat bed trailer.

* * * * *